US009580111B1

(12) United States Patent
Caliskan et al.

(10) Patent No.: US 9,580,111 B1
(45) Date of Patent: Feb. 28, 2017

(54) VEHICLE BODY COMPONENT

(71) Applicant: Ford Global Technologies, LLC, Dearborn, MI (US)

(72) Inventors: Ari Garo Caliskan, Canton, MI (US); Michael M. Azzouz, Livonia, MI (US); Patrick James Blanchard, Ann Arbor, MI (US); Joshua Jacob Clement, Dearborn, MI (US); Jason Scott Balzer, Commerce Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/867,697

(22) Filed: Sep. 28, 2015

(51) Int. Cl.
*B62D 25/04* (2006.01)
*B62D 29/04* (2006.01)

(52) U.S. Cl.
CPC ........... *B62D 25/04* (2013.01); *B62D 29/043* (2013.01)

(58) Field of Classification Search
CPC ....... B62D 25/04; B62D 25/02; B62D 29/043
USPC ............ 296/193.06, 187.12, 203.01, 203.03
See application file for complete search history.

(56) References Cited

U.S. PATENT DOCUMENTS

| | | | | |
|---|---|---|---|---|
| 7,560,003 B2* | 7/2009 | Naughton | ............. | B29C 66/301 156/292 |
| 8,757,709 B2* | 6/2014 | Rawlinson | ........... | B62D 25/025 296/193.06 |
| 8,851,556 B2* | 10/2014 | Nishimura | ............. | B62D 25/04 296/187.12 |
| 8,894,131 B2* | 11/2014 | Mori | ....................... | B62D 25/04 296/193.06 |
| 8,991,909 B2* | 3/2015 | Matsuda | ................ | B62D 25/02 296/187.12 |
| 2008/0001434 A1* | 1/2008 | Henkelmann | .......... | B62D 25/04 296/187.12 |
| 2008/0036235 A1* | 2/2008 | Ameloot | ................ | B62D 25/04 296/102 |
| 2009/0085379 A1* | 4/2009 | Takahashi | ............ | B62D 29/002 296/193.06 |
| 2009/0152896 A1* | 6/2009 | Enderich | ................ | B62D 25/00 296/187.03 |
| 2011/0101734 A1* | 5/2011 | Gunther | ................. | B62D 25/04 296/193.06 |

(Continued)

FOREIGN PATENT DOCUMENTS

DE 102012008060 A1 10/2013
EP 1454819 A2 9/2004

(Continued)

OTHER PUBLICATIONS

Muhr, T. et al., "Economically Viable Lightweight Design Concept for a Hybrid B-pillar", Feb. 16, 2015, 13 pgs., Springer Automotive Media Wiesbaden GmbH 2015.

*Primary Examiner* — Gregory Blankenship
(74) *Attorney, Agent, or Firm* — Jason C. Rogers; Brooks Kushman P.C.

(57) ABSTRACT

A vehicle body assembly includes an outer component defining a cavity. The outer component has a pair of first flanges. An inner component has a pair of second flanges each joined to one of the first flanges. A reinforcement formed of carbon fiber is disposed in the cavity between the components. The reinforcement includes a faceplate joined to the outer component with a rivet and third flanges each joined to the inner component with a rivet.

17 Claims, 5 Drawing Sheets

(56) References Cited

U.S. PATENT DOCUMENTS

| | | | | |
|---|---|---|---|---|
| 2012/0193939 A1* | 8/2012 | Howe | ............... | B32B 15/14 |
| | | | | 296/187.01 |
| 2013/0052392 A1* | 2/2013 | Radlmayr | ............ | B29C 70/688 |
| | | | | 428/68 |
| 2013/0113237 A1* | 5/2013 | Huhn | ............... | B21D 53/88 |
| | | | | 296/193.05 |
| 2014/0145469 A1* | 5/2014 | Mildner | ............ | B62D 29/005 |
| | | | | 296/193.06 |
| 2015/0078654 A1* | 3/2015 | Chaudhury | ......... | G06T 7/0002 |
| | | | | 382/159 |
| 2015/0375800 A1* | 12/2015 | Wagner | ............ | B62D 29/046 |
| | | | | 296/187.03 |
| 2016/0039470 A1* | 2/2016 | Sakuragi | ........... | B62D 21/157 |
| | | | | 296/193.06 |
| 2016/0059894 A1* | 3/2016 | Ohhara | ............. | B62D 25/04 |
| | | | | 296/193.06 |
| 2016/0152277 A1* | 6/2016 | Rocheblave | ......... | B62D 25/04 |
| | | | | 296/193.06 |
| 2016/0200371 A1* | 7/2016 | Inamoto | ............ | B62D 25/04 |
| | | | | 296/203.01 |

FOREIGN PATENT DOCUMENTS

| | | |
|---|---|---|
| EP | 1557342 A2 | 7/2005 |
| WO | 2010003524 A1 | 1/2010 |

* cited by examiner

VEHICLE BODY COMPONENT

TECHNICAL FIELD

The present disclosure relates to a vehicle body assembly including a carbon fiber component.

BACKGROUND

The current regulatory and economic environment has increased the importance of making vehicles more fuel efficient while maintaining or improving functionality and durability. One way to reduce the fuel consumption of a vehicle is to reduce the weight of the vehicle. Vehicle weight can be reduced by changing the materials of select components from steel to composite.

SUMMARY

According to one embodiment, a vehicle body assembly includes an outer component having an outer panel and a pair of sidewalls cooperating to define a U-shaped cavity, and a pair of first flanges each extending from one of the sidewalls. An inner component has an inner panel spanning the cavity and a pair of second flanges each extending from the inner panel and joined to one of the first flanges. A carbon-fiber component has a faceplate and a pair of webs cooperating to define an open cavity, and a pair of third flanges each extending from one of the webs. The carbon-fiber component is received within the U-shaped cavity and is sandwiched between the inner and outer components such that the faceplate is disposed against the outer panel and the third flanges are disposed against the inner panel. At least one first rivet joins the faceplate and the outer panel, and at least one second rivet joins one of the third flanges to the inner panel.

In some embodiments, the carbon-fiber component includes a plurality of plies compression molded into a monocoque structure. The carbon-fiber component may have a hat-channel cross section. The carbon-fiber component may also include adhesive between the faceplate and the outer panel, and between the third flanges and the inner panel.

According to another embodiment, a B-pillar assembly includes an outer component defining a cavity. The outer component has a pair of first flanges. An inner component has a pair of second flanges each joined to one of the first flanges. A hat-channel reinforcement formed of carbon fiber is disposed in the cavity between the components. The reinforcement includes a faceplate joined to the outer component with a rivet and third flanges each joined to the inner component with a rivet.

In some embodiments, the hat-channel reinforcement includes a plurality of plies compression molded into a monocoque structure. The hat-channel reinforcement may also include adhesive between the faceplate and the outer panel, and between the third flanges and the inner panel.

According to yet another embodiment, a carbon-fiber reinforcement for a B-pillar having inner and outer components includes a faceplate. The reinforcement also includes a pair of webs extending from the faceplate and cooperating with the faceplate to define a U-shaped channel. A pair of flanges each extends from one of the webs. The reinforcement is configured to be sandwiched between the inner and outer components with the faceplate disposed against the outer component and the flanges disposed against the inner component.

In some embodiments, the carbon-fiber reinforcement includes a plurality of plies compression molded into a monocoque structure. The carbon-fiber reinforcement may have a hat-channel cross section. The carbon-fiber component may also include adhesive between the faceplate and the outer panel, and between the third flanges and the inner panel.

BRIEF DESCRIPTION OF THE DRAWINGS

FIG. 1 is a perspective view of a B-pillar assembly looking from outside the vehicle in.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
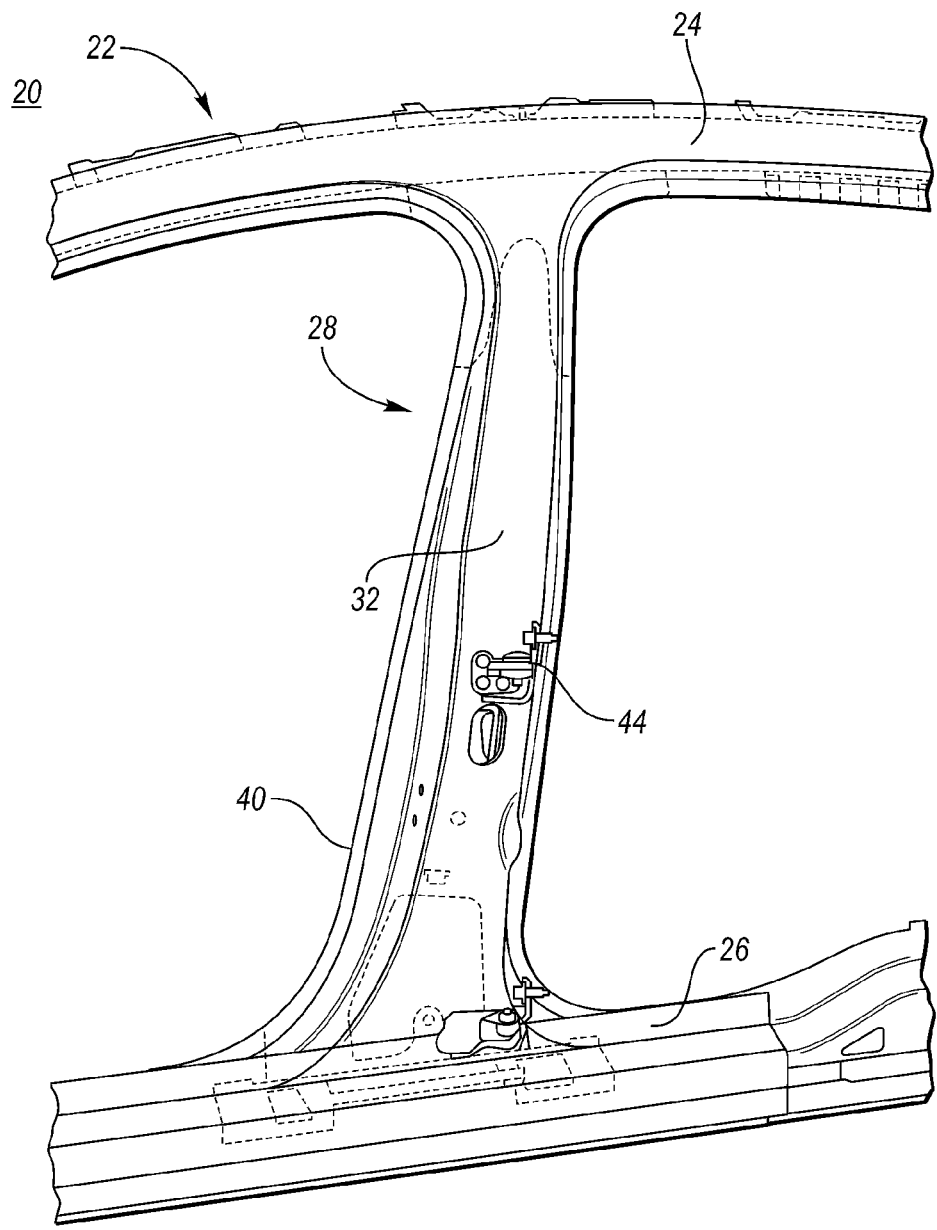
Figure 2:
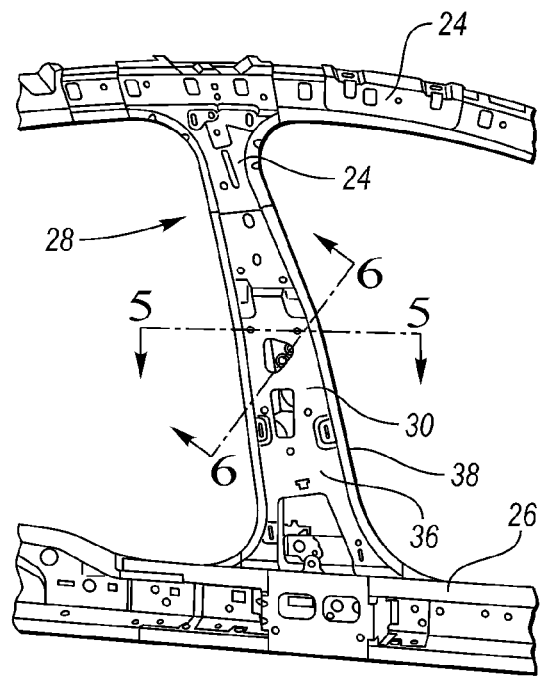
FIG. 2 is a perspective view of the B-pillar assembly looking from inside the vehicle out.

Referring to FIGS. 1 and 2, a vehicle 20 includes a body structure 22 having a roof-rail assembly 24, a rocker assembly 26, and a B-pillar assembly 28. An upper end of the B-pillar 28 is connected to the roof rail 24 and a lower end of the B-pillar 28 is connected to the rocker 26. The B-pillar 28 includes an inner component 30, an outer component 32, and a reinforcing member (not shown) disposed between the inner and outer components 30, 32. The reinforcing member may be a composite component that includes carbon fiber or glass fiber. Carbon fiber, for example, has a higher strength-to-weight ratio than steel and can meet or exceed strength requirements while also reducing weight of the vehicle. In some embodiments, the inner component 30 includes an upper junction bracket 34 and a lower component 36. The inner component 30 may include a pair of flanges 38 and the outer component 32 may include a pair of flanges 40. The inner and outer components 30, 32 are shaped and assembled such that the flanges 38 engage with the flanges 40 when the B-pillar is assembled. The flanges 38 are connected to the flanges 40 via any method known to a person skilled in the art. For example, the flanges may be spot welded together along a pair of weld lines. One or more of the door hinges 44 may be attached to the B pillar 28 such that the door and 44 is disposed against the outer component 32.

Figure 3:
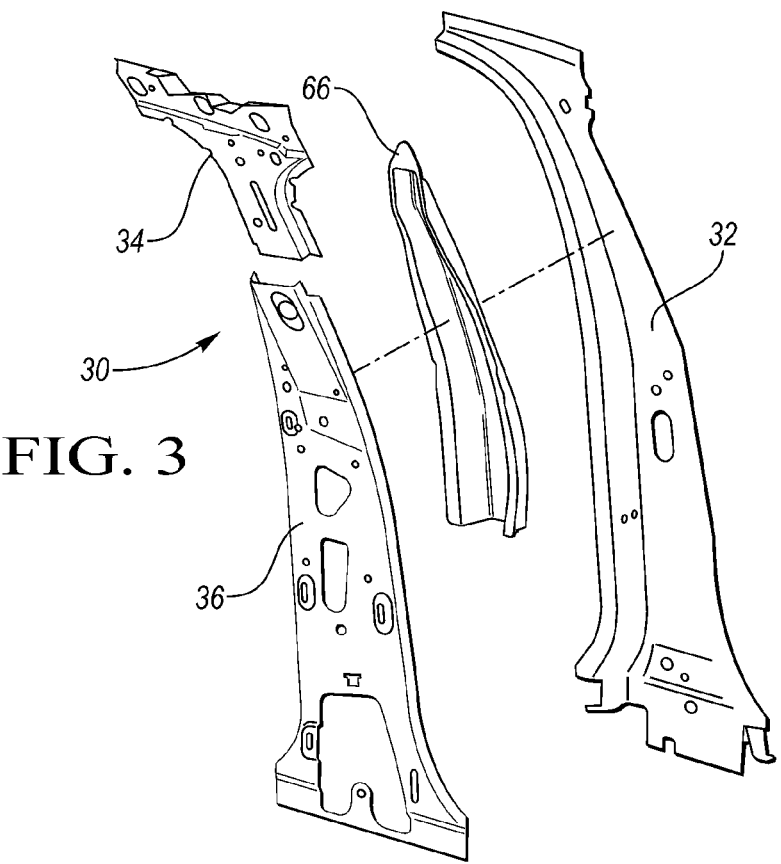
FIG. 3 is an exploded perspective view of the B-pillar.
Figure 4:
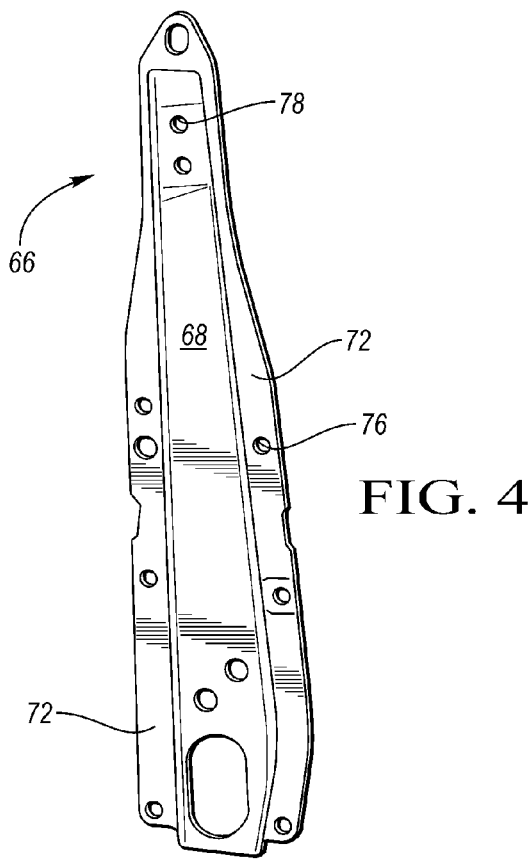
FIG. 4 is a perspective view of a reinforcement component of the B-pillar.
Figure 5:
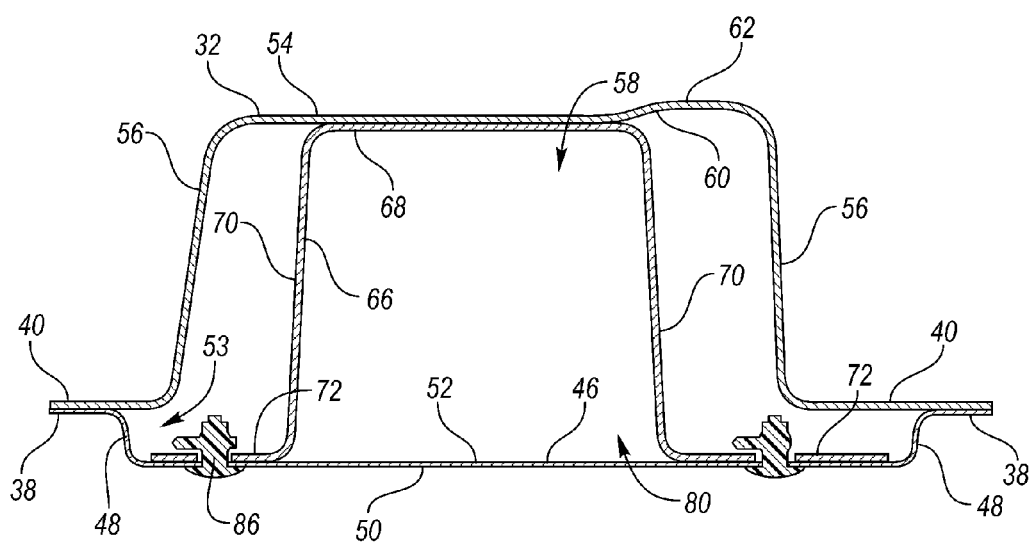
FIG. 5 is a cross-sectional view of the B-pillar along cutline 5-5.

Referring to FIGS. 3 through 5, the inner component 30 includes an inner panel 46 extending between the flanges 38. The inner panel 46 is offset relative to the flanges 38 and each flange is connected to the inner panel via a step 48. The inner panel 46 and the steps 48 cooperate to define a recessed area 53. The inner panel 46 includes a first surface 50 that defines the inner side of the B-pillar 28, and a second surface 52 that faces the outer component 32.

The outer component 32 includes an outer panel 54 between the flanges 40. The outer panel 54 includes a pair of sidewalls 56 that each extend between the outer panel 54 and one of the flanges 40. The outer panel 54 and sidewalls 56 cooperate to define a U-shaped cavity 58. The outer panel 54 includes a first surface 60 that forms a boundary of the cavity 58, and a second surface 62 that defines the outer side of the B-pillar 28.

The reinforcement component 66 is disposed between the inner and outer components 30, 32. The reinforcement 66 may be made out of carbon-fiber reinforced polymer (or carbon fiber for short). The carbon-fiber component 66 may be formed into a hat section including a faceplate 68, webs 70 extending generally perpendicular to the faceplate 68, and a pair of flanges 72 that each extend outwardly from one of the webs 70. The faceplate 68 and the webs 70 cooperate to define a U-shaped cavity 74. Each of the flanges 72 define at least one aperture 76 and the faceplate 68 defines at least one aperture 78.

When assembled, the reinforcement component 66 is sandwiched between the inner component 30 and the outer component 32 such that the reinforcement is nested within the U-shaped cavity 58 with the faceplate 68 disposed against the first surface 60 of the outer panel 54. The flanges 72 are disposed against the second surface 52 of the inner component 30. The reinforcement 66 may be sized to fit completely within the B-pillar interior 80 that is defined by the inner component 30 and the outer component 32.

The carbon-fiber reinforcement 66 is secured to the inner and outer components 30, 32 via adhesive and mechanical fasteners such as rivets. For example, one or more beads of adhesive 82 may be disposed between the faceplate 68 and the first surface 60 of the outer component 32. One or more beads of adhesive 82 may also be disposed on each of the flanges 72 to bond the flanges 72 to the second surface 52 of the inner component 30. The reinforcement 66 includes apertures 76 and 78 that are aligned with select apertures of the inner and outer components. One or more rivets 84 are received in the aligned apertures of the faceplate 68 and outer component 32 to mechanically fasten the reinforcement 66 to the outer component 32. One or more rivets 86 are received in the aligned apertures of the flanges 72 and the inner component 30 to mechanically fasten the reinforcement 66 to the inner component 30. The adhesive may cure when heated (such as during e-coating or painting). Thus, the rivets secure the reinforcement 66 until the adhesive cures. This may be superior to designs which only use adhesive because it may speed-up and simplify manufacturing of the B-pillar 28.

The carbon-fiber reinforcement 66 increases the stiffness and strength of the B-pillar to meet vehicle performance metrics. By connecting the reinforcement 66 to both the inner and outer components 30, 32 a stiffer section is achieved compared to reinforcements that only connect with one of the inner or outer components.

Figure 6:
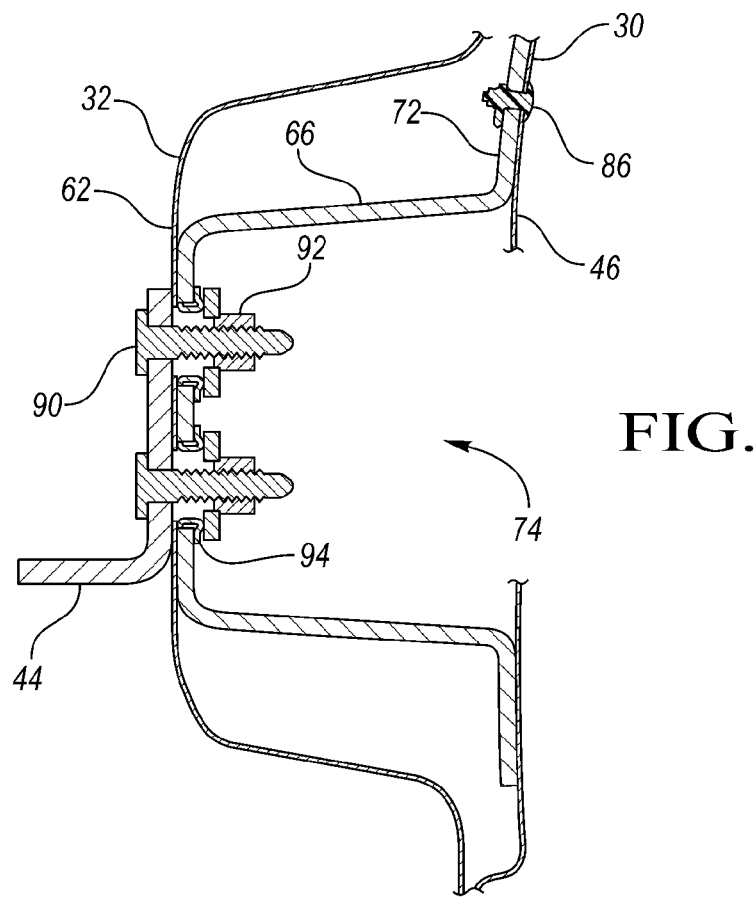
FIG. 6 is a cross-sectional view of the B-pillar along cutline 6-6.

Referring to FIG. 6, the outer component 32 and the reinforcement 66 may also be connected via the door-hinge bolts 90. The door hinge 44 may be connected to the second surface 62 via a pair of bolts 90 and a pair of nuts 92. The bolts 90 extend through the hinge 44, the outer component 32, and the reinforcement 66. The nuts 92 are located within the U-shaped cavity 74. The inner component 30 may include an opening for providing access to the nuts 92. In order to prevent creep in the carbon-fiber reinforcement 66, compression limiters 94 may be disposed in the apertures that are defined in the faceplate 68. The compression limiters 94 reduce force on the reinforcement 66 by transferring a portion of the compression forces directly between the bolt head and the nut to reduce stress on the carbon-fiber component 66 preventing creep.

Figure 7A:
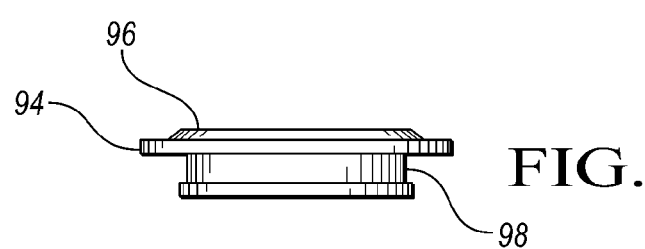
FIG. 7A is a side view of a compression limiter.
Figure 7B:
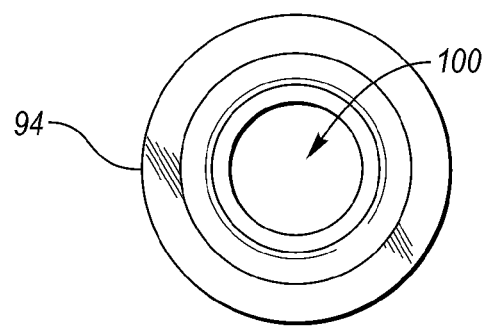
FIG. 7B is a top view of the compression limiter of FIG. 7A.

Referring to FIGS. 7A and 7B, each of the compression limiters 94 includes a head 96 that may be annular and a sleeve 98 that extends from the head. The sleeve 98 may be cylindrical cylinder. The head 96 and the sleeve 98 cooperate to define a hole 100 for receiving the bolt 90. Typically, the compression limiters are made of metal (such as steel). When the fasteners are installed, the door hinge engages the head 96 and the sleeve 98 engages with the nut 92.

Figure 8:
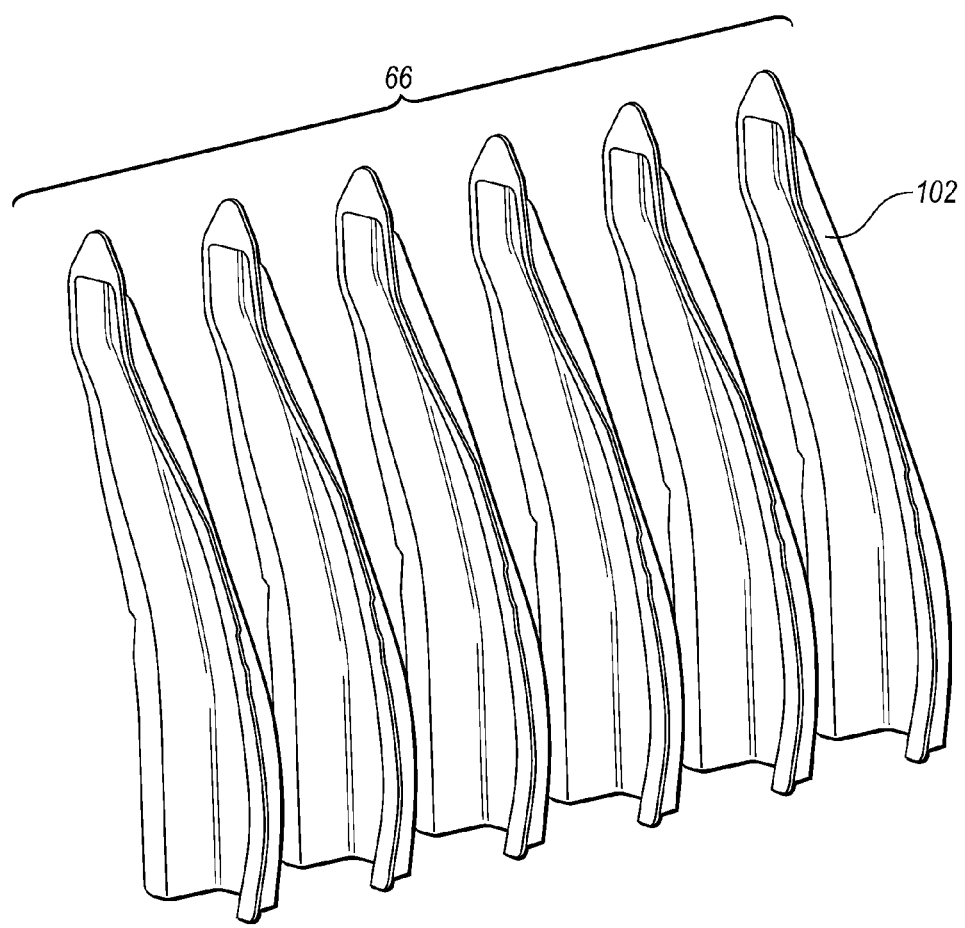
FIG. 8 is an exploded perspective view of the reinforcement component.

Referring to FIG. 8, the carbon-fiber reinforcement 66 may be made of a plurality of carbon-fiber layers (fabric layers) that are either non-crimp fabric, or braided. The fabric layers are also referred to as plies. The carbon-fiber filaments of each of the layers may be placed at a 0°/60°/−60° orientation with respect to the longitudinal axis of the B-pillar 28. The greatest filament content may be in the 0° direction. For example, 50% of the filaments may be in the 0° direction (i.e. the longitudinal direction), 25% of the filaments are in the 60° direction, and 25% of filaments are in the −60° direction.

The carbon-fiber reinforcement 66 may be formed of six pre-impregnated plies 102 that are compression molded to form the finished part. In an example process, the carbon-fiber reinforcement 66 may be manufactured by first cutting each ply in the appropriate shape and stacking the plies on top of each other. The stack of plies is then loaded into an oven and heated to approximately 60-90° C. to soften the pre-impregnated resin. The stack is then loaded into a preformed tool that roughly shapes the stack into a preformed part. After the preform cools in the tool, the preform part is placed in the molding tool where heat and pressure is applied forming the plies into a monocoque carbon-fiber reinforcement 66. The open channel section (e.g. a hat section) allows the carbon-fiber component 66 to be compression molded and mass produced. Reinforcements having a closed-box section cannot be compression molded and are ill suited for mass production.

The compression molding process is well suited for mass production of carbon fiber components. This makes it more economically viable than other solutions such as resin-transfer molding, which is more time-consuming and expensive and are only feasible for lower volume productions.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle body assembly comprising:
   an outer component including an outer panel and a pair of sidewalls cooperating to define a U-shaped cavity, and a pair of first flanges each extending from one of the sidewalls;
   an inner component including an inner panel spanning the cavity and a pair of second flanges each extending from the inner panel and joined to one of the first flanges;
   a carbon-fiber component including a faceplate and a pair of webs cooperating to define an open cavity, and a pair of third flanges each extending from one of the webs, wherein the carbon-fiber component is received within the U-shaped cavity and sandwiched between the inner and outer components such that the faceplate is disposed against the outer panel and the third flanges are disposed against the inner panel;
   at least one first rivet joining the faceplate and the outer panel; and
   at least one second rivet joining one of the third flanges to the inner panel.

2. The assembly of claim 1 wherein the carbon-fiber component has a hat-channel cross section.

3. The assembly of claim 1 wherein at least one of the third flanges defines a hole and the second rivet extends through the hole.

4. The assembly of claim 1 wherein the carbon-fiber component further includes a plurality of plies compression molded into a monocoque structure.

5. The assembly of claim 1 further comprising adhesive disposed between and bonding the outer panel and faceplate, and additional adhesive disposed between and bonding each of the third flanges to the inner panel.

6. A B-pillar assembly comprising:
   an outer component defining a cavity and including a pair of first flanges;
   an inner component including a pair of second flanges each joined to one of the first flanges; and
   a hat-channel reinforcement formed of carbon fiber, disposed in the cavity between the components, and including a faceplate joined to the outer component with a rivet and third flanges each joined to the inner component with a rivet.

7. The assembly of claim 6 wherein the inner component spans the cavity.

8. The assembly of claim 6 wherein the reinforcement further includes a pair of webs each extending between the faceplate and one of the third flanges.

9. The assembly of claim 8 wherein the faceplate and the webs cooperate to define a U-shaped cavity.

10. The assembly of claim 6 wherein the outer component further includes an outer panel and a pair of sidewalls that cooperate to define the cavity, and wherein each of the first flanges are attached to one of the sidewalls.

11. The assembly of claim 10 wherein the faceplate is joined to the outer panel.

12. The assembly of claim 11 wherein the faceplate and outer panel are joined with adhesive.

13. The assembly of claim 6 wherein the third flanges are each bonded to the inner component with adhesive.

14. The assembly of claim 6 wherein the first and second flanges are joined by welding.

15. The assembly of claim 6 wherein the reinforcement further includes a plurality of plies compression molded into a monocoque structure.

16. A vehicle body assembly comprising:
    a B-pillar including:
       an outer component including an outer panel defining a first hole, a pair of sidewalls cooperating with the outer panel to define a U-shaped cavity, and a pair of first flanges each extending from one of the sidewalls,
       an inner component including an inner panel spanning the cavity and a pair of second flanges each extending from the inner panel and joined to one of the first flanges,
       a carbon-fiber component including a faceplate and a pair of webs cooperating to define an open cavity, and a pair of third flanges each extending from one of the webs, wherein the carbon-fiber component is received within the U-shaped cavity and sandwiched between the inner and outer components such that the faceplate is disposed against the outer panel and the third flanges are disposed against the inner panel, and wherein the faceplate defines a second hole,
       at least one first rivet joining the faceplate and the outer panel,
       at least one second rivet joining one of the third flanges to the inner panel, and
       a compression limiter disposed in the second hole and defining an opening; and
    a door hinge defining a third hole and mounted to the outer panel of the B-pillar by a fastener extending through the first, second and third holes and through the opening.

17. The vehicle body assembly claim 16, wherein the compression limiter further includes a head disposed against the door hinge and a shank disposed in the second hole.

* * * * *